(12) United States Patent
De Ruiter

(10) Patent No.: US 7,662,747 B2
(45) Date of Patent: Feb. 16, 2010

(54) ACTIVATED CHARCOAL PRODUCTION

(76) Inventor: Ernest De Ruiter, Höhenstrasse 57a, D-51381 Leverkusen (DE)

(*) Notice: Subject to any disclaimer, the term of this patent is extended or adjusted under 35 U.S.C. 154(b) by 555 days.

(21) Appl. No.: 10/567,794

(22) PCT Filed: Jul. 24, 2004

(86) PCT No.: PCT/EP2004/008314

§ 371 (c)(1), (2), (4) Date: Feb. 9, 2006

(87) PCT Pub. No.: WO2005/016819

PCT Pub. Date: Feb. 24, 2005

(65) Prior Publication Data

US 2008/0118425 A1    May 22, 2008

(30) Foreign Application Priority Data

Aug. 11, 2003  (DE) ................................ 103 37 100
Sep. 20, 2003  (DE) ................................ 103 43 637

(51) Int. Cl.
*C01B 31/08*  (2006.01)
*C01B 31/10*  (2006.01)
*D01F 9/12*   (2006.01)

(52) U.S. Cl. ................. 502/418; 502/423; 502/432; 423/447.2

(58) Field of Classification Search ............... 502/423, 502/432
See application file for complete search history.

(56) References Cited

U.S. PATENT DOCUMENTS

| | | | | |
|---|---|---|---|---|
| 4,273,619 A * | 6/1981 | Angelo, II | ................. | 202/211 |
| 4,439,209 A | 3/1984 | Wilwerding et al. | ........... | 48/76 |
| 5,212,144 A * | 5/1993 | Schwartz, Jr. | ................ | 502/423 |
| 5,437,237 A * | 8/1995 | Digre | ......................... | 110/346 |
| 6,309,200 B1 | 10/2001 | Teutsch | ....................... | 425/104 |
| 6,316,378 B1 | 11/2001 | Giebelhausen et al. | ......... | 502/10 |
| 7,288,504 B2 * | 10/2007 | Von Blucher et al. | ........ | 502/432 |
| 2003/0092560 A1 | 5/2003 | Von Blucher et al. | .......... | 502/10 |
| 2004/0038802 A1 | 2/2004 | Von Blucher et al. | .......... | 502/10 |

FOREIGN PATENT DOCUMENTS

| | | |
|---|---|---|
| DE | 199 12 154 A1 | 11/2000 |
| WO | WO 01/02295 A2 | 1/2001 |
| WO | WO 01/83368 A1 | 11/2001 |

* cited by examiner

*Primary Examiner*—Jerry Lorengo
*Assistant Examiner*—Joseph V Micali
(74) *Attorney, Agent, or Firm*—Edward E. Sowers; Brannon & Associates PC

(57) ABSTRACT

The invention relates to a process for producing granular, particularly spherical activated carbon by carbonization of suitable carbonaceous polymers in the form of polymer granules, in particular polymer spherules, as a starting material, which are convertible by carbonization into carbon at least essentially, wherein the polymer granules, in particular the polymer spherules, are continuously moved through a carbonization apparatus comprising a plurality of temperature zones and/or a temperature gradient so that an at least essentially complete conversion of the starting material to carbon is effected.

20 Claims, 1 Drawing Sheet

US 7,662,747 B2

ACTIVATED CHARCOAL PRODUCTION

CROSS-REFERENCES TO RELATED APPLICATIONS

This application is a National Stage filing of International Application PCT/EP2004/008314, filed Jul. 24, 2004, claiming priority to German Application No. DE 103 37 100.1, filed Aug. 11, 2003 and DE 103 43 637.5, filed Sep. 20, 2003, entitled "Activated Charcoal Production". The subject application claims priority to PCT/EP2004/008314 and to German Application Nos. DE 103 37 100.1 and DE 103 43 637.5 and incorporates all by reference herein, in their entirety.

BACKGROUND OF THE INVENTION

The present invention relates to a process for producing activated carbon, particularly in granule form ("granulocarbon"), preferably in spherical form ("spherocarbon"), and also to the thus produced activated carbon products and their use for various applications, particularly for filters or for protective materials, for example protective suits.

Activated carbon has fairly unspecific adsorptive properties and for this reason is the most widely used adsorbent. Legislative strictures as well as the rising sense of responsibility for the environment lead to a rising demand for activated carbon.

Activated carbon is generally produced by smoldering (also referred to by the synonyms of "carbonization" and "pyrolysis") and subsequent activation of carbonaceous compounds, preferably such starting compounds or reactants that lead to economically reasonable yields because the weight losses through split-off of volatile constituents in the course of smoldering and through burn-out in the course of activation are appreciable. For further details concerning the production of activated carbon, see for example H. v. Kienle and E. Bäder, Aktivkohle und ihre industrielle Anwendung [Activated Carbon and Its Industrial Use], Enke Verlag Stuttgart, 1980.

The constitution of the activated carbon produced—finely or coarsely porous, firm or brittle—is also dependent on the starting material. Examples of customary starting materials are coconut shells, wood wastes, peat, bituminous coal, pitches, but also particular plastics or polymers which play a certain part in the production of woven activated carbon fabrics for example.

Activated carbon is used in various forms: pulverized carbon, splint coal carbon, granulocarbon, molded carbon and also, since the end of the 1970s, spherical activated carbon ("spherocarbon"), as well as fibrous activated carbon ("fibrocarbon", for example in the form of fabrics of activated carbon fibers). Spherical activated carbon in particular has a number of advantages compared with other forms of activated carbon, such as pulverized, splint coal, granulocarbon and the like that make it valuable or even indispensable for certain applications: It is free flowing, enormously abrasion resistant (dustless) and very hard. However, owing to its high cost, its use is essentially limited to protective suits and high-performance filters for noxiants in air-streams.

Granulocarbon, especially spherocarbon, is in great demand on account of its specific shape, but also on account of its extremely high abrasion-resistance, for example for particular fields of use, examples being sheet filters for protective suits against chemical poisons and filters for low noxiant concentrations in large volumes of air. For instance, when reticulated, large-cell polyurethane foams are loaded with activated carbon as described in DE 38 13 563 A1, for example, only a very free-flowing carbon can be used if optimal coverage of the inner layers of the foam material is to be achieved as well. The manufacture of protective suits against chemical poisons on the lines of DE 33 04 349 C3, for example, can likewise utilize only a highly abrasion-resistant carbon, and only spherocarbon fits this description.

Spherocarbon is even now mostly produced by multistage processes which are very costly and inconvenient. The most well-known process consists in spherules being produced from coal tar pitch and suitable asphaltic residues from the petrochemical industry and oxidized (to render them unmeltable), smoldered and activated. For example, spherocarbon can be produced from bitumen in a multistage process. These multistage processes are very cost-intensive and the associated high cost of this spherocarbon prevents many applications wherein spherocarbon ought to be preferable by virtue of its properties.

There have consequently been various attempts to produce high-grade spherocarbon in some other way:

It is prior art to produce spherocarbon by smoldering and subsequent activation of new or used ion-exchangers containing sulfonic acid groups, or by smoldering ion-exchanger precursors in the presence of sulfuric acid and subsequent activation, the sulfonic acid groups and the sulfuric acid respectively having the function of a crosslinker, the yields obtained, which do not depend on whether ready-produced cation-exchanger resins or unsulfonated ion-exchanger precursors are used as starting material, being about 30% to 50%, based on organic or polymeric starting material. Such processes are described, for example, in DE 43 28 219 A1 and DE 43 04 026 A1 and also in DE 196 00 237 A1 including the German patent application DE 196 25 069 A1. But these processes are disadvantageous and problematic in particular because of the large amounts of sulfur dioxide released (about 1 kg of $SO_2$ per kg of end product) and also because of the (partly) associated corrosion problems in the manufacturing equipment. When used ion-exchanger resins, especially used cation-exchanger resins, are used as starting materials, there is also the problem that these, although they have been washed with acid, are contaminated with cations which then accumulate in the end-product, so that the production of major amounts of spherocarbon in consistent quality is consequently very difficult. When ion-exchanger precursors, i.e. polymer spherules without exchanger groups like sulfonic acid groups, are used, it is additionally necessary to use large amounts of sulfuric acid and/or oleum for the crosslinking during the smoldering.

WO 98/07655 A1 describes a process for producing spherules of activated carbon wherein a mixture comprising a distillation residue from diisocyanate production and a carbonaceous processing aid or additive with or without one or more further additives is processed into free-flowing spherules which are subsequently smoldered and then activated. This process likewise releases, in the course of the smoldering step, large pulses of decomposition products, which is associated with the problems described above.

WO 01/83368 A1 describes a process for producing spherical activated carbon by smoldering and activation of polymer spherules based on styrene and divinylbenzene and containing chemical groups which, when thermally decomposed, lead to free radicals and thus to cross-linkages, especially sulfonic acid groups, wherein the polymer spherules are initially continuously pre-smoldered and subsequently discontinuously post-smoldered and activated. The two-stage operation of smoldering/carbonization as pre-smoldering (i.e. pre-carbonization) and post-smoldering (i.e. post-carbonization) is not always achievable, often as a result of limitation imposed by the equipment actually available.

The problem underlying the present invention consists in providing a process for efficient production of activated carbon, particularly in granule or sphere form. The process shall make it possible to produce activated carbon in a less inconvenient and in particular in a very economical manner.

Applicant has now found that, surprisingly, the problem underlying the present invention is solved when in the process for producing granular, in particular spherical activated carbon starting from suitable carbonaceous polymers (for example organic polymers) as a starting material which are convertible by carbonization into carbon at least essentially, the step of carbonization is effected by moving the starting material continuously through a carbonization apparatus comprising a plurality of temperature zones (i.e. reaction zones) or a temperature gradient such that an at least essentially complete conversion of the starting material to (elemental) carbon is effected.

BRIEF SUMMARY OF THE INVENTION

The invention relates to a process for producing granular, particularly spherical activated carbon by carbonization of suitable carbonaceous polymers in the form of polymer granules, in particular polymer spherules, as a starting material, which are convertible by carbonization into carbon at least essentially, wherein the polymer granules, in particular the polymer spherules, are continuously moved through a carbonization apparatus comprising a plurality of temperature zones and/or a temperature gradient so that an at least essentially complete conversion of the starting material to carbon is effected.

One object of the present invention is to provide an improved process for producing granular activated carbon.

Related objects and advantages of the present invention will be apparent from the following description.

DETAILED DESCRIPTION OF THE INVENTION

Figure 1:
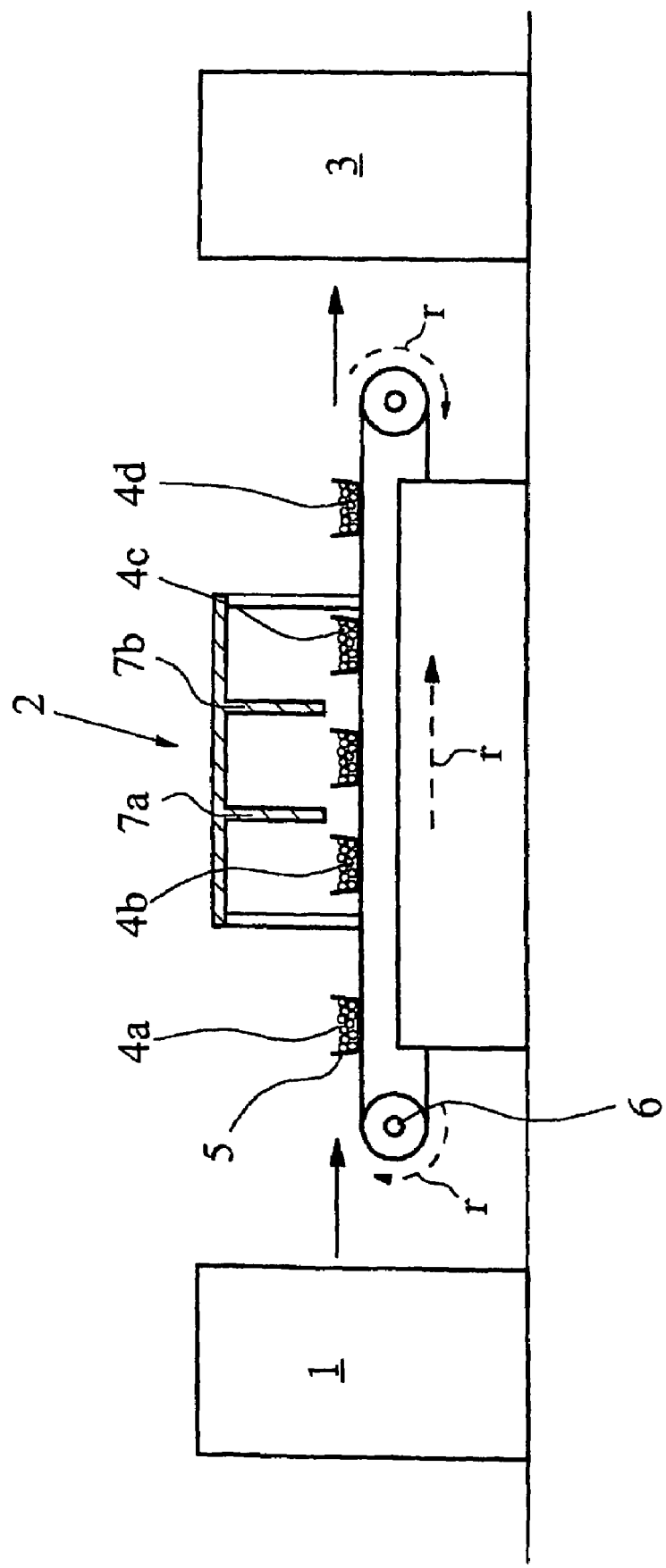
FIG. 1 is flow diagram illustrating the method of the subject invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The fundamental principle of the present invention thus consists in conducting the entire carbonization operation, with its various process steps or sectors to be carried out at different temperatures, in just a single apparatus which has to comprise, as proposed, a plurality of temperature zones or a temperature gradient for this purpose. This makes it possible to perform the carbonization operation continuously, i.e., without any interruption, in particular without the apparatus being changed, which allows a not insignificant simplification and efficiency enhancement of the process operation, associated with economic savings.

The temperature zones or the temperature gradient on the one hand and, on the other, the speed at which the starting material moves through the carbonization apparatus have to be chosen and in particular conformed to each other such that an at least essentially complete conversion of the carbonizable starting material to carbon is effected. The arrangement and choice of the constitution of the temperature zones or of the temperature gradient in cooperation with the speed at which the starting material moves through the carbonization apparatus constitute means for specifically controlling or influencing the processing sequence of the present invention.

In general, the conveying of the starting material according to the present invention is effected in that the starting material is continuously moved through the temperature zones and/or the temperature gradient of the carbonization apparatus by means of transporting or conveying means, in particular by means of a moving transporting or conveying belt, such that an at least essentially complete conversion of the starting material to carbon is effected. The speed of the conveying belt has to be conformed to the temperature profile of the temperature zones or of the temperature gradient, and/or vice versa.

The carbonization apparatus used for carrying out the process of the present invention is for example a continuous rotary tube or a continuous rotary tube oven; here, the charged material, i.e., the carbonizable starting material, can be conveyed or transported by means of suitable transporting or conveying means, respectively, through the rotary tube or through the rotary tube oven, examples being suitable propulsive bodies, for example a screw conveyor. It is similarly possible to transport or convey the charged material through appropriate inclination of the rotary tube or the rotary tube oven. It is similarly possible to provide a combination of the aforementioned measures to transport or convey the charged material through the rotary tube or through the rotary tube oven.

A so-called belt-oven, in particular a so-called oxidizing belt-oven (i.e. oxidation belt-oven), is a particularly suitable carbonization apparatus for carrying out the process of the present invention. Such systems are marketed by numerous firms, for example by Sarnes Ingenieure of Ostfildern in Germany, and comprise in general a combined unit of transporting/conveying belt on the one hand and oven/heating apparatus on the other, the material to be treated in the oven or heating means being transportable or conveyable through the interior of the oven or heating means via the transporting/conveying belt.

Useful starting materials for the inventive production of activated carbon are smolderable or carbonizable polymers, i.e. carbonaceous polymers convertible by pyrolysis or carbonization to elemental carbon at least essentially.

The form or shape of the polymeric starting material is in general at least essentially or substantially preserved in the carbonization operation, which with or without subsequent activation does however give rise to a reduction in the particle size or particle diameter. Consequently, to produce activated carbon in granule form, in particular in sphere form, polymer granules or spherules, i.e. polymers in granule or sphere form or substantially in granule or sphere form, have to be used as starting materials (the polymer granules or spherules used according to the present invention generally have diameters of up to about 2 mm and in particular of up to about 1.5 mm or less). Similarly, the particle size of the granulo- or spherocarbon obtained depends on the size of the granules or spherules in the starting material. Commercially available starting materials generally lead to activated carbon granules or spherules about 0.1 mm to about 2.0 mm in diameter, in particular in the range from about 0.2 mm to about 1.0 mm and preferably in the range from about 0.3 mm to about 0.8 mm, with average values in the range from about 0.4 mm to about 0.6 mm.

The polymeric starting material may be for example in porous, in particular macroporous, and/or gel-like form. In the case of gel-like starting materials, preference is given to using microporous polymeric particles. Preference is given to using macroporous or microporous gel-like starting materials. Because the form or shape of the polymeric starting material is in general at least essentially or substantially preserved in the carbonization operation, the properties, in particular the morphology (for example porosity), of the smoldered/carbonized products can be controlled or influenced through specific choice of the starting material. For example, the porosity of the starting material also determines the porosity of the smoldered/carbonized products.

Useful starting materials include for example organic polymeric granules or spherules which possess a polymeric skeleton consisting essentially of polystyrene, in which case the polystyrene chains can be locally connected or crosslinked by means of a component having at least two vinyl groups per molecule, in particular divinylbenzene, and the polymer skeleton may contain functional chemical groups which, when thermally decomposed, lead to free radicals and thus to cross-linkages, in particular sulfonic acid groups. More particularly, the starting material used for the inventive production of granular or spherical activated carbon comprises organic polymeric granules or spherules based on divinylbenzene-crosslinked polystyrene which contain functional chemical groups, in particular acidic groups such as sulfonic acid groups, which, when thermally decomposed, lead to free radicals and thus to cross-linkages; the divinylbenzene content may be up to about 20% by weight, in particular up to about 15% by weight and preferably up to about 10% by weight, based on the polymer spherules. But instead of divinylbenzene, the polystyrene may also be crosslinked using a comparable organic, in particular aromatic organic compound having at least two crosslinking groups, in particular vinyl groups, per molecule that is suitable for crosslinking polystyrene.

The weight ratio of polymer to chemical groups which, when thermally decomposed, lead to free radicals and thus to cross-linkages, in particular the weight ratio of polymer to sulfonic acid groups, can vary within wide limits; advantageously, it is generally in the range of from about 5:1 to about 1:1, in particular in the range of from about 2:1 to about 1:1. It is nonetheless possible to depart from the values mentioned.

In a first embodiment of the process according to the present invention, the chemical groups leading to cross-linkages, in particular strongly acidic groups such as sulfonic acid groups, are already present in the starting material.

Nonlimiting examples of polymeric starting materials where the chemical functional groups, in particular sulfonic acid groups, leading to cross-linkages in the course of carbonization or pyrolysis are already present in the actual starting material are ion-exchanger resins, in particular strongly acidic cation exchanger resins, such as cation-exchanger resins, having sulfonic acid groups. The ion-exchanger resins in question may be unused ion-exchanger resins or else used ion-exchanger resins. In the case of used cation-exchangers, these may be contaminated with metal ions which are then present in the end-product as catalytic metallic impregnation. In the case that used or spent ion-exchangers are used as starting material, the present invention similarly concerns a process for disposing of used or spent ion-exchangers. This is because the process of the present invention is able to convert the used ion-exchangers to be disposed of into a useful product—i.e. activated carbon—which contributes to environmental protection by virtue of its ability to adsorb environmental poisons.

A further example of polymeric starting materials wherein the chemical functional groups, in particular sulfonic acid groups, leading to cross-linkages in carbonization or pyrolysis are already present in the actual starting material is acidic organic catalysts, for example catalysts for bisphenol synthesis or for MTBE (methyl tert.-butyl ether) synthesis, preferably organic catalysts containing sulfonic acid groups. Particular preference is given to acidic organic catalysts of the above-described kind which may be porous and/or gel-like. This is because applicant has surprisingly found that for example the deactivated acidic organic catalysts generated in MTBE or bisphenol synthesis are a good starting material for the production of granulo- or spherocarbon. The granular or spherical catalyst material coming from the bisphenol or MTBE synthesis reactor—if appropriate after washing and drying—can then be smoldered/carbonized and, if appropriate, activated according to the present invention. Still-adhering phenol in the case of catalysts from the bisphenol process is destroyed in the carbonization or pyrolysis or/and burned in the post-carbonization step. The yields of activated carbon granules or spherules in the case of the organic catalysts are similar to those obtained in the case of cation exchangers. Unlike with used ion exchangers, however, with used organic catalysts there is no need to consider the problem of cations accumulating in the carbon. According to the present invention, the spent or exhausted acidic organic catalysts from MTBE synthesis or from the synthesis of bisphenol from phenol and acetone which are generated as waste can readily be used as starting materials and disposed of in this way. When spent or deactivated acidic polymeric organic catalysts based on styrene and divinylbenzene, in particular from the MTBE process or from the bisphenol process, are used as starting material, the present invention similarly concerns a process for disposing of spent catalysts or catalysts which have become inert. The process of the present invention makes it possible to convert the wastes to be disposed of into a useful product—activated carbon—which contributes to environmental protection by virtue of its ability to adsorb environmental poisons.

Even though the chemical groups, in particular strongly acidic groups such as sulfonic acid groups, leading to cross-linkages are already present in the starting material, it may be preferable to contact the starting material, in particular the ion-exchanger resins or the acidic organic catalysts, before and/or during the carbonization with a sulfonating agent, preferably $SO_3$, more preferably in the form of sulfuric acid and/or oleum, in particular in an amount from about 1% to about 30% by weight of $SO_3$ and in particular 5% by weight to about 25% by weight of $SO_3$, based on the dry weight of the starting material; this additionally increases the number of free radicals formed in the carbonization and leads to increased cross-linkages in the polymers, so that finally more stable or more compact, in particular more abrasion-resistant, end-products in the form of carbon granules or carbon spherules result and more particularly the yield of activated carbon is increased as well. As well as increasing the yield of end product or activated carbon, the times for the carbonization can also be distinctly shortened as a result. This is because, as applicant has found, the yields of activated carbon can be increased with increasing acid content or sulfonic acid group content of the starting material. For example, starting materials, in particular ion-exchangers or catalysts, having a lower acid content can be admixed with some oleum and/or sulfuric acid to improve the yield. Normally, for example, about 1% to about 30% by weight of bound or free $SO_3$, based on the polymer fraction in the starting material, is sufficient. The introduction of additional sulfonic acid groups by sulfonation can be carried out either as a separate process step outside the carbonization apparatus (either continuously or discontinuously) or else advantageously in the carbonization apparatus itself, as more particularly described hereinbelow. This offers the decisive advantage that not just the entire carbonization operation can be carried out continuously within one apparatus, but the additional sulfonation too can take place in the same apparatus as a process step upstream of the carbonization operation.

In a further, alternative embodiment of the process according to the present invention, the chemical groups which, when thermally decomposed, lead to free radicals and thus to cross-linkages, in particular strongly acidic groups such as sulfonic acid groups, are introduced into the starting material before and/or during the carbonization operation. This can be done for example by sulfonating the polymeric starting material, preferably by addition of a sulfonating agent, in particular $SO_3$, preferably in the form of oleum and/or sulfuric acid, more preferably in the form of oleum mixed with sulfuric acid. The unsulfonated starting material is contacted with the aforementioned sulfonating agent, for example by mixing the polymer granules or spherules with the sulfonating agent, in particular oleum and/or sulfuric acid, for which care should be taken to ensure that the polymeric starting material is contacted or mixed very homogeneously and completely with the sulfonating agent without "dry places/zones" (i.e. unwetted places/zones of the starting material) being left behind on the starting material. This can be ensured by using an excess of sulfonating agent to produce a "wet mix" in the form of a homogeneous porridge which then, under elevated temperatures, finally leads to the sulfonation of the starting material. But it is particularly preferable for the non-sulfonated polymeric starting material (in particular a starting material in the form of polymer granules or spherules, preferably based on divinylbenzene-crosslinked polystyrene) to be contacted, before introduction to the carbonization apparatus, with the sulfonating agent such that an at least essentially complete wetting of the polymeric starting material or of the polymer granules or spherules with the sulfonating agent is ensured; this is advantageously accomplished by contacting the non-sulfonated polymeric starting material with the sulfonating agent in suitable mixing means by intensive mixing or co-mixing, preferably such that an at least essentially complete wetting of the polymeric starting material takes place, preferably in a twin-screw extruder to which the polymeric starting material to be sulfonated and the sulfonating agent can be fed in a suitable manner (for example via separate feed channels); this particular embodiment has the advantage that a homogeneous, uniform and essentially complete wetting of the polymeric starting material with the sulfonating agent is achieved and, on the other hand, favorable mixing ratios, in particular relatively low amounts of sulfonating agent, can be used by virtue of the intensive co-mixing; in other words, a (large) excess of sulfonating agent does not have to be used; the aforementioned particular embodiment, which utilizes mixing means ensuring intensive co-mixing of the sulfonating agent with the polymeric starting material to be sulfonated, further provides relatively short residence times, which is favorable with regard to the process sequence, since high throughputs can be achieved. Preferably, the contacting of the non-sulfonated polymeric starting material with the sulfonating agent takes place in a temperature range between room temperature (about 20° C.) and at temperatures below the melting point or melting range of the polymeric starting material, preferably in the range from about 20° C. to about 100 to 150° C., preferably at room temperature. Useful sulfonating agents include in particular sulfuric acid, oleum and sulfuric acid/oleum mixtures; the sulfuric acid used is preferably concentrated sulfuric acid, more preferably 90% to 100% sulfuric acid, even more preferably in a mixture with oleum (oleum is a particular form of concentrated sulfuric acid which contains varying amounts of sulfur trioxide $SO_3$; 20% oleum for example contains 20% of sulfur trioxide). In general, the sulfonating agent (in particular concentrated sulfuric acid and/or oleum) is used in relation to the polymeric starting material to be sulfonated in weight-based ratios of sulfonating agent to polymeric starting material in the range from 0.2:1 to 2:1, in particular in the range from 0.4:1 to 1.5:1.

The unsulfonated starting material is suitably sulfonated using in particular oleum, in which case the polymer/oleum 20% weight ratio can be up to about 1:1 or more for example, or else oleum-sulfuric acid mixtures, in which case the polymer/oleum 20%/sulfuric acid weight ratio can be about 1:1:0.5 for example.

The sulfonation itself can be carried out as a separate process step outside the carbonization apparatus (either continuously or discontinuously) or else advantageously in the carbonization apparatus itself, as will be more particularly described hereinbelow. The last-mentioned possibility offers the decisive advantage that not just the entire carbonization operation can be carried out within one apparatus and continuously but also—in the case of unsulfonated starting materials or starting materials having low sulfonic acid group contents—the sulfonation can be provided in the same apparatus as a process step upstream of the carbonization operation.

This second embodiment, which utilizes starting materials where the chemical groups which, when thermally decomposed, lead to free radicals and thus to cross-linkages (for example strongly acidic groups such as sulfonic acid groups) have to be introduced into the starting material before and/or during carbonization, offers the advantage over the first embodiment that less costly materials are used.

Examples of starting materials suitable according to the present invention which are in accordance with the second embodiment and where chemical groups which, when thermally decomposed, lead to free radicals and thus to cross-linkages (examples being strongly acidic groups such as sulfonic acid groups) are introduced into the starting material before and/or during the carbonization operation are for example polymer granules, in particular polymer spherules, based on styrene and divinylbenzene, for example precursors of ion-exchanger resins, as described above. The precursors for ion-exchangers can in principle be gel-like or macroporous. The latter are significantly more expensive, mainly on account of their considerably higher divinylbenzene content. Their numerous mesopores are fully preserved during the conversion into activated carbon, and this is important for some applications. The gel-types, by contrast, lead to markedly microporous carbons. The pore volume may be up to 90% to 95% present as micropores. The gel-types often contain about 2% to about 8% of divinylbenzene. But even only lightly crosslinked types having a lower level of divinylbenzene (about 2% to 4% of divinylbenzene) survive the severe swelling in the acid, thus do not burst or break apart into semispheres. It has emerged that types having a very low divinylbenzene content are very suitable for the purposes of the present invention. A much more important aspect is the sulfonation, which has to be as complete as possible, since the decomposition of the sulfonic acid groups gives rise to those free radicals which lead to the cross-linkages responsible for the yield. While not only macroporous but also gel-types can be used when starting from cation-exchangers and the choice is more a question of economics, gel-types are preferred when precursors of ion-exchangers (=pure polymers) are used. The reason is as follows: The macroporous precursors absorb a great deal of acid or oleum in their large pores in the manner of a sheet of blotting paper, so that the mixture of polymer and acid is dry or sandy and a uniform distribution of the acid is scarcely achieved. Apart from that, however, the carbonization and activation of cation-exchangers leads to comparable products than when starting from precursors and acid.

To carry out the process of the present invention, a preferred embodiment of the present invention is characterized in that the carbonization apparatus comprises at least the following temperature zones in the following order:

a) optionally, a first temperature zone ("sulfonating zone") where in the case that the starting material contains no groups which, when thermally decomposed, lead to free radicals and thus to cross-linkages, in particular no strongly acidic groups such as sulfonic acid groups, or else in the case that such groups are to be additionally introduced into the starting material, these groups are introduced into the starting material, in particular by sulfonation;

b) a second temperature zone ("pre-carbonization zone" or "zone of acidic gases"), preferably having a higher average temperature than the first temperature zone, wherein in the second temperature zone the groups which, when thermally decomposed, lead to free radicals and thus to cross-linkages, in particular strongly acidic groups such as sulfonic acid groups, are detached or split off from the starting material, so that carbonization and/or thermal decomposition of the starting material ensues, preferably accompanied by a crosslinking of the polymers and/or a formation of carbon; and c) at least one third temperature zone ("post-carbonization zone"), preferably having a higher average temperature than the second temperature zone, wherein in the third temperature zone further carbonization of the starting material resulting from the second temperature zone is performed, so that an at least essentially complete conversion of the starting material to carbon is effected.

The process of the present invention thus offers the decisive advantage that the entire smoldering or carbonizing operation, i.e. pre-carbonization plus post-carbonization, and additionally, if appropriate, the preceding sulfonating operation, can be operated continuously in a single apparatus.

As stated above, a first temperature zone a) can for the case that the starting material contains no groups which, when thermally decomposed, lead to free radicals and thus to cross-linkages, in particular no strongly acidic groups such as sulfonic acid groups, or else for the case that such groups are to be additionally introduced into the starting material, can be the location for the introduction or the additional introduction of these groups into the starting material, in particular by sulfonating. This is why this zone is also referred to as "sulfonating zone". Sulfonating is effected in a conventional manner as already described. In general, the first temperature zone is operated for this purpose at temperatures in the range of from 50 to 200° C., in particular in the range from 75 to 175° C. and preferably in the range from 100 to 150° C. However, this temperature zone is optional and can be dispensed with if, for example, starting material having a sufficient content of groups which, when thermally decomposed, lead to free radicals and thus to cross-linkages, in particular sulfonated starting material (for example strongly acidic cation-exchangers having sulfonic acid groups), is used or else the sulfonation is carried out separately in an upstream step. Advantageously, when an unsulfonated polymeric starting material is used, this starting material is contacted with the sulfonating agent before introduction into the sulfonating zone, preferably such that an at least essentially complete wetting of the polymeric starting material or of the polymer granules or spherules with the sulfonating agent is ensured; for further details in this regard, see the above observations.

The two subsequent temperature zones b) and c) then effect the carbonization of the sulfonated starting material, i.e. in two stages, namely pre-carbonization b) (second temperature zone or "pre-carbonization zone") and post-carbonization c) (third temperature zone or "post-carbonization zone"). Since the pre-carbonization b) in the second temperature zone releases, through the specific decomposition of the starting material, acidic gases (mainly $SO_2$, as well as small amounts of $SO_3$, $H_2SO_4$ and also, if appropriate, other acidic gases), this zone is also referred to as "zone of acidic gases". The third temperature zone or post-carbonization zone c), by contrast, does not release any acidic gases, but predominantly carbon oxides, such as carbon monoxide and carbon dioxide, hydrocarbons, hydrogen and water.

The temperatures at which the second and third temperature zones b) and c) can be operated can vary within wide limits. For example, the second temperature zone b) can be operated at temperatures in the range from 100 to 500° C. and in particular in the range from 150 to 450° C. The third temperature zone c) can be operated for example at temperatures above 400° C., in particular above 450° C. to 500° C., for example at temperatures in the range from 400 to 1.200° C., in particular in the range from 450 to 1.000° C., preferably in the range from 500° C. to 900° C. and more preferably in the range from 550 to 850° C.

Smoldering—also referred to by the synonyms of "carbonization" or "pyrolysis" and consisting in the case of the present invention of pre-carbonization b) (second temperature zone) and post-carbonization (third temperature zone)—converts the carbonaceous starting material to carbon; in other words, the starting material is carboned or carbonized. Smoldering or carbonization, which detaches or sets free volatile constituents such as in particular $SO_2$, destroys the functional chemical groups, in particular sulfonic acid groups, to form free radicals which effect the pronounced crosslinking without which there would be no pyrolysis residue (=carbon). In general, the pyrolysis or carbonization is carried out under an inert atmosphere (for example nitrogen) or an at most slightly oxidizing atmosphere. It can similarly be advantageous for the inert atmosphere of the carbonization operation, in particular if it is carried out at comparatively high temperatures (for example in the range from about 500° C. to 650° C.), to be admixed with a minor amount of oxygen, especially in the form of air (for example 1% to 5%) in order that an oxidation of the carbonized polymer skeleton may be effected and activation may thereby be facilitated.

Advantageously, the individual temperature zones are separately or independently controllable. The individual temperature zones can each be assigned takeoff means, in which case it may be preferable for the individual temperature zones to be assigned separate or independent takeoff means, so that the process gases from the different temperature zones can be separated or separately collected (an example being the separate collection of the acidic process gases). This makes it possible for example to separate the acidic or corrosive phase (pre-carbonization, associated with $SO_2$ emission) from the high-temperature phase (post-carbonization). This is because applicant has found that pre-smoldered/pre-carbonized starting material does not release any acidic or corrosive entities as the temperature is further increased.

It may similarly be preferable to provide the carbonization apparatus with at least one lock (i.e. a sluice or transfer canal), in particular between individual successive temperature zones and/or within individual temperature zones, preferably at least between the second and third temperature zones, so that there is at least essentially no mixing through of process gases from different temperature zones between which at least one lock is disposed; this makes it possible to ensure that the acidic process gases (in particular $SO_2$) from the second temperature zone are not mixed with the other process gases for example and can be collected separately, if appropriate followed by disposal or reprocessing with subsequent recycling. For instance, the $SO_2$ continuously expelled during the pre-carbonization in particular can be regenerated, in particular via a catalytic oxidation to $SO_3$ and further conversion to sulfuric acid and/or oleum. The presence of one or more locks similarly makes it possible for gas to be specifically added to individual temperature zones (examples being the addition of minor amounts of oxygen) or to maintain a certain gas composition in certain temperature or reaction zones or parts of temperature or reaction zones (for example an inert atmosphere in parts of the pre-carbonization zone and a slightly oxidizing atmosphere in parts of the post-carbonization zone).

For advantageous process management, it is advisable to provide continuous temperature transitions between the individual temperature zones and also within any one individual temperature zone and avoid large temperature differences (i.e. "temperature jumps"). This makes it possible to obtain particularly high-quality products, since in particular bursting or shattering of the starting materials, as can occur when temperature jumps are large, is avoided. It is therefore similarly advisable for advantageous process management to provide a temperature gradient within any one individual temperature or reaction zone as well, preferably such that the transition to the next temperature or reaction zone is at least essentially continuous, i.e. not abrupt.

The process control can be specifically controlled by setting the temperature profile in the individual temperature zones and/or the temperature profile of the temperature gradient and/or by setting the speed at which the starting material moves through the temperature zones and/or the temperature gradient of the carbonization apparatus.

The total residence time of the starting material in the carbonization apparatus is not critical and can vary within wide limits. It is generally in the range from 0.1 to 5 hours, in particular in the range from 0.25 to 4 hours and preferably in the range from 0.5 to 3 hours.

Carbonization is generally followed by an activation of the smoldered/carbonized material. This activation is generally effected under conditions known per se. The basic principle of activation is for a portion of the carbon generated in the course of carbonization to be selectively and specifically degraded under suitable conditions. This gives rise to numerous pores, fissures and cracks and the surface area of a unit mass increases appreciably. Activation thus amounts to a specific burn-out of the carbon. Since carbon is degraded in the course of the activation, this operation is accompanied by a loss of substance which may be appreciable and which under optimal conditions is equivalent to an increase in the porosity and an increase in the internal surface area (pore volume). Activation is therefore effected under selective or controlled, oxidizing conditions. Customary activating gases are generally oxygen, in particular in the form of air, water vapor and/or carbon dioxide and also mixtures of these activating gases. Since there is a danger with oxygen that it will act not selectively but over the entire surface (as a result of which the carbon burns off to a greater or lesser extent), water vapor and carbon dioxide are preferred. Very particular preference is given to water vapor, if appropriate mixed with an inert gas (nitrogen for example). To achieve an industrially adequate reaction rate, the activation is generally carried out at temperatures in the range from about 700° C. to about 1.200° C., in particular in the range from about 800° C. to about 1.110° C., preferably in the range from about 850° C. to about 1.000° C. and more preferably in the range from about 900° C. to about 975° C. The duration of the activation can vary within wide limits and can for example be in the range from about 0.5 to about 6 hours, in particular in the range from about 1.5 to about 5 hours and preferably in the range from about 2 to about 3.5 hours.

According to the invention, the activation can be carried out in particular with a mixture of water vapor and nitrogen, in particular at temperatures in the range from about 850° C. to about 960° C. and preferably in the range from about 910° C. to about 930° C. The residence times can range from about 0.5 to about 20 hours, in particular from about 2 hours to about 15 hours and preferably from about 5 hours to about 10 hours.

The activation can in principle also be carried out in the carbonization apparatus. But in general the activation is carried out in a distinct apparatus, in particular at separate locations and times than the carbonization.

The sole FIGURE shows a diagram of a typical sequence for the inventive process according to a particular embodiment. The smolderable or carbonizable starting material 4a, for example polymer spherules based on divinylbenzene-crosslinked polystyrene, i.e. unsulfonated starting material, is provided in 1. The unsulfonated starting material 4a is then contacted with a suitable sulfonating agent, in particular sulfur trioxide, preferably in the form of an oleum-sulfuric acid mixture, and subsequently introduced portion-wise into dedicated reaction vessels 5 which continuously move on a suitable transporting or conveying means, in particular a moving transporting or conveyor belt, through the carbonization apparatus 2, in particular a belt oven, in the direction r. The carbonization apparatus comprises in the case of the illustrated embodiment three temperature zones which are each separated from each other by locks 7a, 7b, so that at least essentially no co-mixing of process gases from different temperature zones between which a lock 7a, 7b is disposed can take place, more particularly the acidic process gases from the second temperature zone are not commixed with the other process gases and can be collected separately. The starting material 4b contacted with the sulfonating agent is initially sulfonated in the first temperature zone of the carbonization apparatus 2 and subsequently introduced into a second temperature zone for pre-carbonization, in the course of which the sulfonic acid groups are detached or split off from the starting material, so that carbonization ensues with crosslinking of the free radicals formed. Finally, the thus pre-carbonized material 4c is transported via the transporting or conveying means 6 into a third temperature zone where it is finally further carbonized to form the carbonized product 4d. This can subsequently be fed to an activation 3 to obtain carbonized and activated carbon in sphere form.

The present invention further provides the products produced or producible by the process of the present invention, i.e. activated carbon in granule or sphere form. The continuous operation of the process wherein the starting polymers are continuously, i.e. uninterruptedly, in particular without cooling of the pre-carbonized intermediate products, subjected to carbonization, gives activated carbon having improved properties, in particular having improved mechanical and adsorptive properties. This is because applicant has found that a discontinuous operation in the case of carbonization with separation between pre-carbonization and post-carbonization, as customary in the prior art, in particular with isolation of the pre-carbonized products with intervening cooling, is deleterious with regard to the end-products. But this is precisely what is avoided by the process of the present invention.

As mentioned above, the particle size of the granulo- or spherocarbon obtained depends on the starting material. Commercially available starting materials generally lead to activated carbon granules or spherules having diameters of up to about 2 mm, in particular of up to about 1.5 mm or less, for example in the range from about 0.1 mm to about 1.0 mm, in particular in the range from about 0.2 mm to about 0.8 mm in diameter, having average values in the range from about 0.4 mm to about 0.5 mm. The spherical form of the starting materials is preserved during carbonization and activation. In other words, the form of the starting materials makes it possible to control and determine the particle size of the end-product in a specific manner, and this constitutes a further advantage of the process according to the present invention. The diameter of the thus produced activated carbon granules or spherules is about 0.1 mm less than that of the starting polymers, so that the diameter of the spherocarbon can be controlled through appropriate selection of the starting material. Sphere diameters in the range from about 0.2 mm to about 1.0 mm, in particular in the range from about 0.3 mm to about 0.8 mm, with averages in the range from about 0.4 mm to about 0.6 mm, are particularly useful for most applications.

The activation makes it possible to obtain internal surface areas in the range from about 800 $m^2/g$ to about 1500 $m^2/g$ and preferably in the range from about 900 $m^2/g$ to about 1200 $m^2/g$. The bursting pressure of an individual activated carbon granule or spherule is generally in the range from about 5 Newtons to about 20 Newtons. The bulk weight (apparent density) is in the range from about 400 g/l to about 800 g/l and preferably in the range from about 500 g/l to about 750 g/l.

The granulo- or spherocarbon obtained according to the present invention is very abrasion-resistant, free-flowing, dustless and very pressure-resistant. The present invention similarly provides activated carbon granules or spherules of high strength, in particular abrasion-resistant strength, producible by the process of the present invention.

The activity of the spherocarbon is importantly determined by the pores in the activated carbon, in particular by the micropores having a diameter of up to about 20 Å, since most of the molecules to be absorbed are on this order of magnitude. The micropores are generally also responsible for the main fraction of the internal surface area of the activated carbon. In addition, the so-called mesopores—occasionally also referred to as transitional or conducting pores—having diameters in the range from about 20 to about 500 Å are of importance. In addition, there is also a fraction of still larger macropores. The properties of the end products can be controlled in a specific manner through the choice of starting materials and the process management for the activating step. A high fraction of micropores is desirable.

One skilled in the art will know that pore volume, pore diameter and pore distribution vary according to the degree of activation and the pore system and the pore structure, in particular the pore diameter, and also the surface structure of the end product can be influenced in a specific manner through temperature and activation, so that reference may be made to the pertinent technical literature in this regard.

The activated carbon granules or spherules produced by the process of the present invention exhibit good to excellent adsorptive properties. It is further possible to influence or modify the adsorptive properties of the activated carbon granules or spherules produced according to the present invention by impregnation with catalysts (enzymes, metals such as for example copper, silver, platinum, chromium, zinc, mercury, palladium, cadmium, iron, etc. and also compounds of these metals). The activated carbon product obtained according to the production process of the present invention may thus comprise a catalytically effective component, preferably a compound of a catalytically active metal. The impregnation of activated carbon with catalysts is perfectly familiar to one skilled in the art, so that reference may be made to the pertinent technical literature in this regard.

The activated carbon granules or spherules produced by the process of the present invention can be used for a very wide variety of applications. The activated carbon granules or spherules produced by the process of the present invention can find utility for example for producing adsorption materials such as adsorption (sheet) filters, filter mats, odor filters, sheet filters for protective suits, in particular for the civilian and/or military sector, filters for indoor air cleaning, gas mask filters and adsorption-capable supporting structures or else for protective materials, in particular protective suits against chemical poisons such as warfare agents, or for filters, in particular filters for removing noxiant, poisonous and/or odoriferous entities from air or gas streams.

The present invention thus also provides adsorption materials, in particular filters of any kind such as adsorption (sheet) filters, filter mats, odor filters, sheet filters for protective suits, in particular for the civilian and/or military sector, such as protective suits against chemical poisons such as warfare agents, filters for indoor air cleaning, and also protective suits, gas mask filters, filters for removing noxiant, poisonous and/or odiferous entities from air or gas streams produced therefrom and adsorption-capable supporting structures comprising activated carbon granules or spherules produced according to the present invention.

Numerous further refinements, variations or modifications of the present invention will appear conceivable to one skilled in the art who reads the description without his or her leaving the realm of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A process for producing granular activated carbon by carbonization of suitable carbonaceous polymers in the form of polymer granules as a starting material, which polymer granules are convertible by carbonization into carbon, wherein the polymer granules are continuously moved through a carbonization apparatus comprising a plurality of temperature zones so that a complete conversion of the starting material to carbon is effected, wherein the carbonization apparatus comprises at least the following temperature zones in the following order:
   a) a first temperature zone ("sulfonating zone") where in the case that the starting material contains no groups which, when thermally decomposed, lead to free radicals and thus to cross-linkages or else in the case that such groups are to be additionally introduced into the starting material, these groups are introduced into the starting material; then b) a second temperature zone ("pre-carbonization zone" or "zone of acidic gases"), the second temperature zone having a higher average temperature than the first temperature zone, wherein in the second temperature zone the groups which, when thermally decomposed, lead to free radicals and thus to cross-linkages are split off from the starting material, so that carbonization and thermal decomposition of the starting material ensues, accompanied by crosslinking of the polymers and formation of carbon; and then c) a third temperature zone ("post-carbonization zone"), the third carbonization zone having a higher average temperature than the second temperature zone, wherein in the third temperature zone further carbonization of the starting material resulting from the second temperature zone is performed, so that a complete conversion of the starting material to carbon is effected;

wherein the individual temperature zones are separately and independently controlled.

2. The process according to claim 1, wherein the carbonization apparatus used is a continuous rotary tube or a continuous rotary tube oven.

3. The process according to claim 1, wherein the carbonization apparatus used is a belt-oven.

4. The process according to claim 1, wherein the polymer granules are continuously moved through the temperature zones of the carbonization apparatus by means of transporting or conveying means.

5. The process according to claim 1, wherein the individual temperature zones possess separate and independent exhaust means, so that the process gases from the different temperature zones are separated and separately collected.

6. The process according to claim 1, wherein the carbonization apparatus comprises at least one lock between individual successive temperature zones or within individual temperature zones, so that there is at least essentially no mixing through of process gases from different temperature zones between which at least one lock is disposed.

7. The process according to claim 6, wherein at least one lock is present between the second temperature zone and the third temperature zone, so that acidic process gases from the second temperature zone are not mixed with other process gases.

8. The process according to claim 1, wherein process control is performed by setting the temperature profile in the individual temperature zones.

9. The process according to claim 1, wherein process control is performed by setting the speed at which the starting material moves through the temperature zones of the carbonization apparatus.

10. The process according to claim 1, wherein the total residence time of the starting material in the carbonization apparatus is in the range from 0.1 to 5 hours.

11. The process according to claim 1, wherein the first temperature zone is operated at temperatures in the range of from 50 to 200° C.

12. The process according to claim 1, wherein the second temperature zone is operated at temperatures in the range of from 100 to 500° C.

13. The process according to claim 1, wherein the third temperature zone is operated at temperatures in the range of from 400 to 1,200° C.

14. The process according to claim 1, wherein in the first temperature zone the groups which, when thermally decomposed, lead to free radicals and thus to cross-linkages are sulfonic acid groups and are introduced into the starting material by sulfonation.

15. The process according to claim 1, wherein the starting material used comprises polymers in the form of polymer granules based on styrene and divinylbenzene and containing chemical groups which, when thermally decomposed, lead to free radicals and thus to cross-linkages.

16. The process according to claim 15, wherein the chemical groups leading to cross-linkages are sulfonic acid groups being already present in the starting material and wherein the weight ratio of polymers to sulfonic acid groups is in the range from 5:1 to 1:1.

17. The process according to claim 15, wherein the starting material used comprises ion-exchanger resins having sulfonic acid groups or precursors of such ion-exchanger resins.

18. The process according to claim 1, wherein the carbonized material is subsequently subjected to an activation.

19. A process for producing granular activated carbon by carbonization of suitable carbonaceous polymers in the form of polymer granules as a starting material, which polymer granules are convertible by carbonization into carbon, wherein the polymer granules are continuously moved through a carbonization apparatus comprising a plurality of temperature zones so that a complete conversion of the starting material to carbon is effected, wherein the carbonization apparatus comprises at least the following temperature zones in the following order:

a) a first temperature zone ("sulfonating zone") where in the case that the starting material contains no groups which, when thermally decomposed, lead to free radicals and thus to cross-linkages or else in the case that such groups are to be additionally introduced into the starting material, these groups are introduced into the starting material; then b) a second temperature zone ("pre-carbonization zone" or "zone of acidic gases"), the second temperature zone having a higher average temperature than the first temperature zone, wherein in the second temperature zone the groups which, when thermally decomposed, lead to free radicals and thus to cross-linkages are split off from the starting material, so that carbonization and thermal decomposition of the starting material ensues, accompanied by crosslinking of the polymers and formation of carbon; and then c) a third temperature zone ("post-carbonization zone"), the third carbonization zone having a higher average temperature than the second temperature zone, wherein in the third temperature zone further carbonization of the starting material resulting from the second temperature zone is performed, so that a complete conversion of the starting material to carbon is effected;

wherein the individual temperature zones are separately and independently controlled, the carbonization apparatus further comprising at least one lock between individual successive temperature zones or within individual temperature zones, so that there is at least essentially no mixing through of process gases from different temperature zones between which said at least one lock is disposed.

20. A process for producing granular activated carbon by carbonization of suitable carbonaceous polymers in the form of polymer granules as a starting material, which polymer granules are convertible by carbonization into carbon, wherein the polymer granules are continuously moved through a carbonization apparatus comprising a plurality of temperature zones so that a complete conversion of the starting material to carbon is effected, wherein the carbonization apparatus comprises at least the following temperature zones in the following order:

a) a first temperature zone ("sulfonating zone") where in the case that the starting material contains no groups which, when thermally decomposed, lead to free radicals and thus to cross-linkages or else in the case that such groups are to be additionally introduced into the starting material, these groups are introduced into the starting material; then b) a second temperature zone ("pre-carbonization zone" or "zone of acidic gases"), the second temperature zone having a higher average temperature than the first temperature zone, wherein in the second temperature zone the groups which, when thermally decomposed, lead to free radicals and thus to cross-linkages are split off from the starting material, so that carbonization and thermal decomposition of the starting material ensues, accompanied by crosslinking of the polymers and formation of carbon; and then c) a third temperature zone ("post-carbonization zone"), the third carbonization zone having a higher average temperature than the second temperature zone, wherein in the third temperature zone further carbonization of the starting material resulting from the second temperature zone is performed, so that a complete conversion of the starting material to carbon is effected;

wherein the individual temperature zones are separately and independently controlled, with at least one lock being present between the second temperature zone and the third temperature zone, so that acidic process gases from the second temperature zone are not mixed with other process gases.

* * * * *